(12) United States Patent
Buck et al.

(10) Patent No.: US 10,952,567 B2
(45) Date of Patent: Mar. 23, 2021

(54) FOOD SERVING APPARATUS

(71) Applicants: Erika Buck, Vaughn, WA (US); Larry Buck, Vaughn, WA (US)

(72) Inventors: Erika Buck, Vaughn, WA (US); Larry Buck, Vaughn, WA (US)

(*) Notice: Subject to any disclaimer, the term of this patent is extended or adjusted under 35 U.S.C. 154(b) by 380 days.

(21) Appl. No.: 15/601,763

(22) Filed: May 22, 2017

(65) Prior Publication Data
US 2018/0333008 A1 Nov. 22, 2018

(51) Int. Cl.
*A47J 43/28* (2006.01)

(52) U.S. Cl.
CPC ..................... *A47J 43/28* (2013.01)

(58) Field of Classification Search
CPC .............. A01B 1/02; B65D 1/36; A47J 43/28
USPC .......................................................... 294/176
See application file for complete search history.

(56) References Cited

U.S. PATENT DOCUMENTS

| | | | |
|---|---|---|---|
| 2,541,173 A | 2/1951 | Moore | |
| 2,563,223 A * | 8/1951 | Dreher | A47F 13/08 294/180 |
| 3,400,873 A * | 9/1968 | Bessett | B65D 5/5088 206/499 |
| 3,498,798 A | 3/1970 | Baur et al. | |
| 3,740,238 A * | 6/1973 | Graham | B65D 1/36 206/445 |
| 3,835,994 A * | 9/1974 | Davis | B65D 75/22 206/499 |
| 4,686,734 A * | 8/1987 | Alexander | A47L 13/52 15/257.1 |
| 5,626,283 A | 5/1997 | Mellon | |
| 5,842,631 A | 12/1998 | Berger | |
| 6,039,368 A * | 3/2000 | Kowalczyk | A01K 1/0114 119/161 |
| 6,206,279 B1 | 3/2001 | Countee | |
| 6,227,441 B1 | 5/2001 | Sagel et al. | |
| 6,234,549 B1 * | 5/2001 | Brownell | A01K 1/0114 294/1.3 |
| 6,245,367 B1 | 6/2001 | Galomb | |
| 6,249,930 B1 * | 6/2001 | Noggle | A47L 13/52 15/257.1 |
| 6,254,907 B1 | 7/2001 | Galomb | |
| 6,878,199 B2 | 4/2005 | Bowden et al. | |
| 7,163,123 B2 | 1/2007 | Bezek | |

(Continued)

FOREIGN PATENT DOCUMENTS

ES 1060819 U 11/2005
JP 2016047727 A 4/2016

OTHER PUBLICATIONS

Khawsy, Ashley, "Never Get Your Arm Stuck in a Pringles Canister Again With this Chip Dispenser," www.foodbeast.com/news/pringles-canister-chip-dispenser/, Nov. 16, 2013, 2 pages.

(Continued)

*Primary Examiner* — Stephen A Vu
(74) *Attorney, Agent, or Firm* — Chernoff, Vilhauer, McClung & Stenzel, LLP

(57) ABSTRACT

A food serving apparatus with a bottom having two lateral sides, a front side, and a back side, and a center axis, and two flexible side walls, each of which are capable of automatically bending toward a center axis of the food serving apparatus in response to insertion of the apparatus into an open end of a flexible bag.

17 Claims, 3 Drawing Sheets

(56) References Cited

U.S. PATENT DOCUMENTS

| | | | |
|---|---|---|---|
| D674,569 S | * | 1/2013 | Schelling |
| D705,619 S | * | 5/2014 | Masalin ............................ D8/10 |
| D755,307 S | * | 5/2016 | Kino ............................ D21/532 |
| 2005/0079251 A1 | | 4/2005 | Bell |
| 2011/0123685 A1 | | 5/2011 | Chen |

OTHER PUBLICATIONS

Chan, Casey, "Awesome Dude Creates Can That Makes it Easy to Get Pringles Out," http://www.gizmodo.com.au/2013/04/awesome-dude-creates-can-that-makes-it-easy-to-get-pringles-out/, Apr. 9, 2013, 2 pages.

Wilson, Mark, "The Pringles Package Sucks. This Chip Can Blooms Into a Bowl," www.fastcodesign.com/1669476/the-pringles-package-sucks-this-chip-can-blooms-into-a-bowl/, Apr. 10, 2012, 3 pages.

* cited by examiner

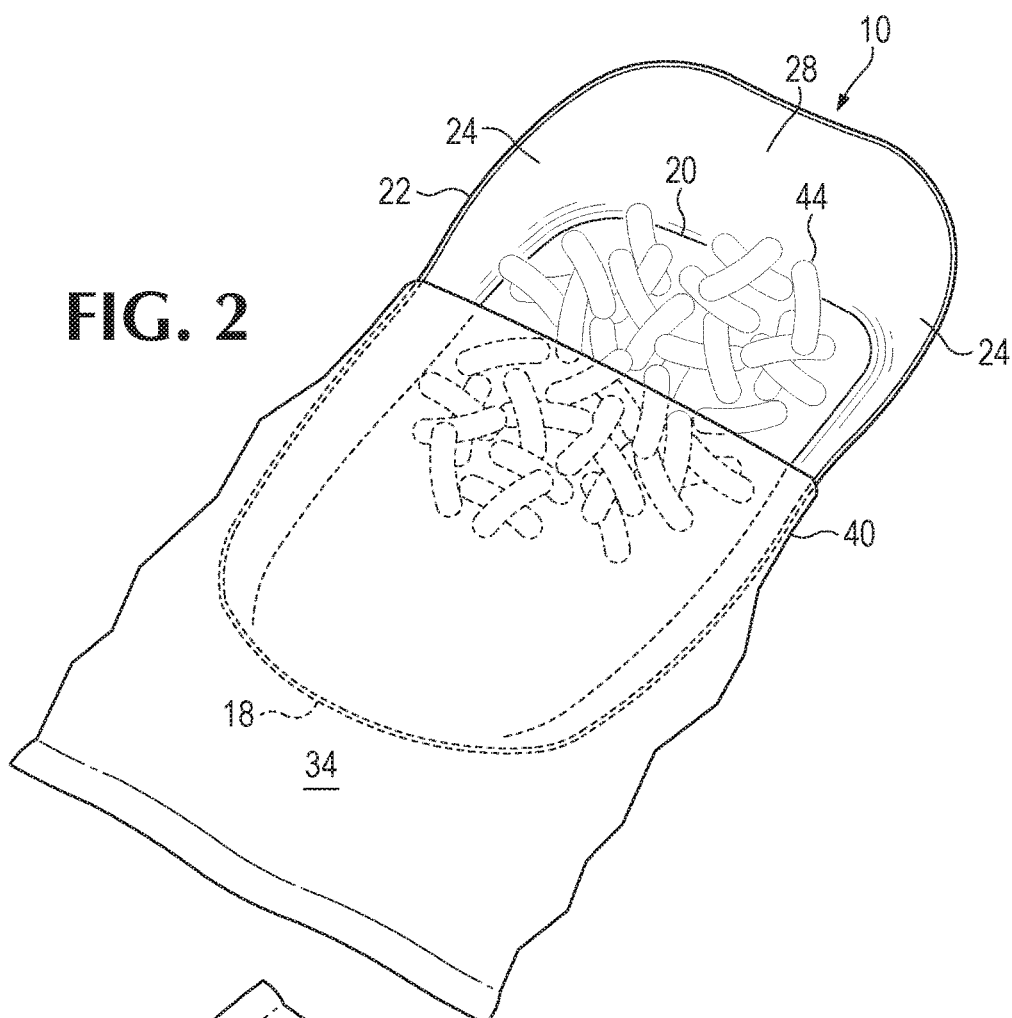
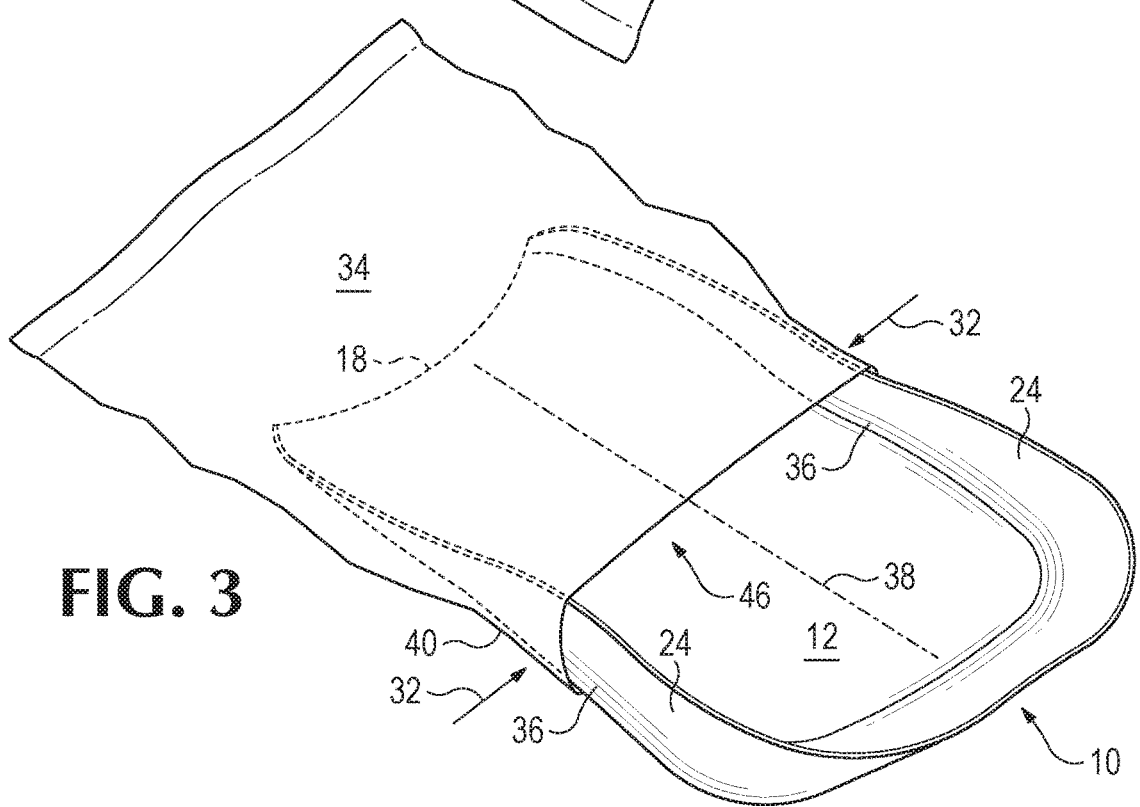

FOOD SERVING APPARATUS

BACKGROUND OF THE INVENTION

The subject matter of this invention relates to food serving devices or apparatus. The snack food bag (sometimes called a chip or crisp bag) has become a ubiquitous type of snack sale and storage means in the area of prepared snacks of all types available at any convenience store. The most common type of snack food bag is made out of metalized polypropylene or low-density polyethylene film, having a thickness generally within the range of 10 to 250 micrometers, and may be shaped as needed by individual manufacturers. Most snack food bags are formed by a tubular piece of the polypropylene material, which is sealed at the top and bottom ends using heat and/or an adhesive for sealing. To access the contents of a snack food bag, a user can pry open one of the sealed ends of the bag, to either reach inside the bag, or pour out the contents of the bag into a separate container.

Accessing the contents of a snack bag by reaching inside often does not promote mindful eating, as it is often not easy to quickly determine the amount that has been consumed. For those who pour the contents of a snack food bag into a separate container, there is no simple manner to return the contents into the bag, should they not be eaten. Pouring the contents back into the bag can easily result in spilled and broken snacks. Often a user will decide to simply throw away the uneaten snacks, believing that trying to get the snacks back into the original bag is not worth the effort. In addition, users anticipate that after presenting a container of snacks for a group of people to eat, the snacks may be contaminated with bacteria from the various individuals reaching into the container.

SUMMARY OF THE INVENTION

In one embodiment, the food serving apparatus described herein may include a bottom surface having an upwardly curving perimeter that forms a resiliently deformable sidewall of a continuously varying depth. The resilient sidewall may extend throughout at least one half of the perimeter.

In another embodiment, the food serving apparatus described herein may include a bottom having two lateral sides, a front side, and a back side, and two resilient side walls, each of which extending along each of the two lateral sides. A back wall has a depth and is structured so that the back wall extends from the back side and connects each of the two lateral sides.

In yet another embodiment, the food serving apparatus described herein may include a bottom having two lateral sides, a front side, and a back side, and a center axis. The embodiment may further include two resilient side walls, each of which is capable of automatically resiliently bending toward the center axis in conformable response to insertion of the apparatus into an open end of a container.

BRIEF DESCRIPTION OF THE DRAWINGS

For a better understanding of the invention, and to show how the same may be carried into effect, reference will now be made, by way of example, to the accompanying drawings, in which:

FIG. 2 is an isometric view of an embodiment of the food serving apparatus from the front side of the apparatus, in use to withdraw snack food from a bag.

FIG. 3 is an isometric view of the embodiment of the food serving apparatus from the back side of the apparatus, in preparation for pouring snack food into a bag.

DETAILED DESCRIPTION

Figure 1:
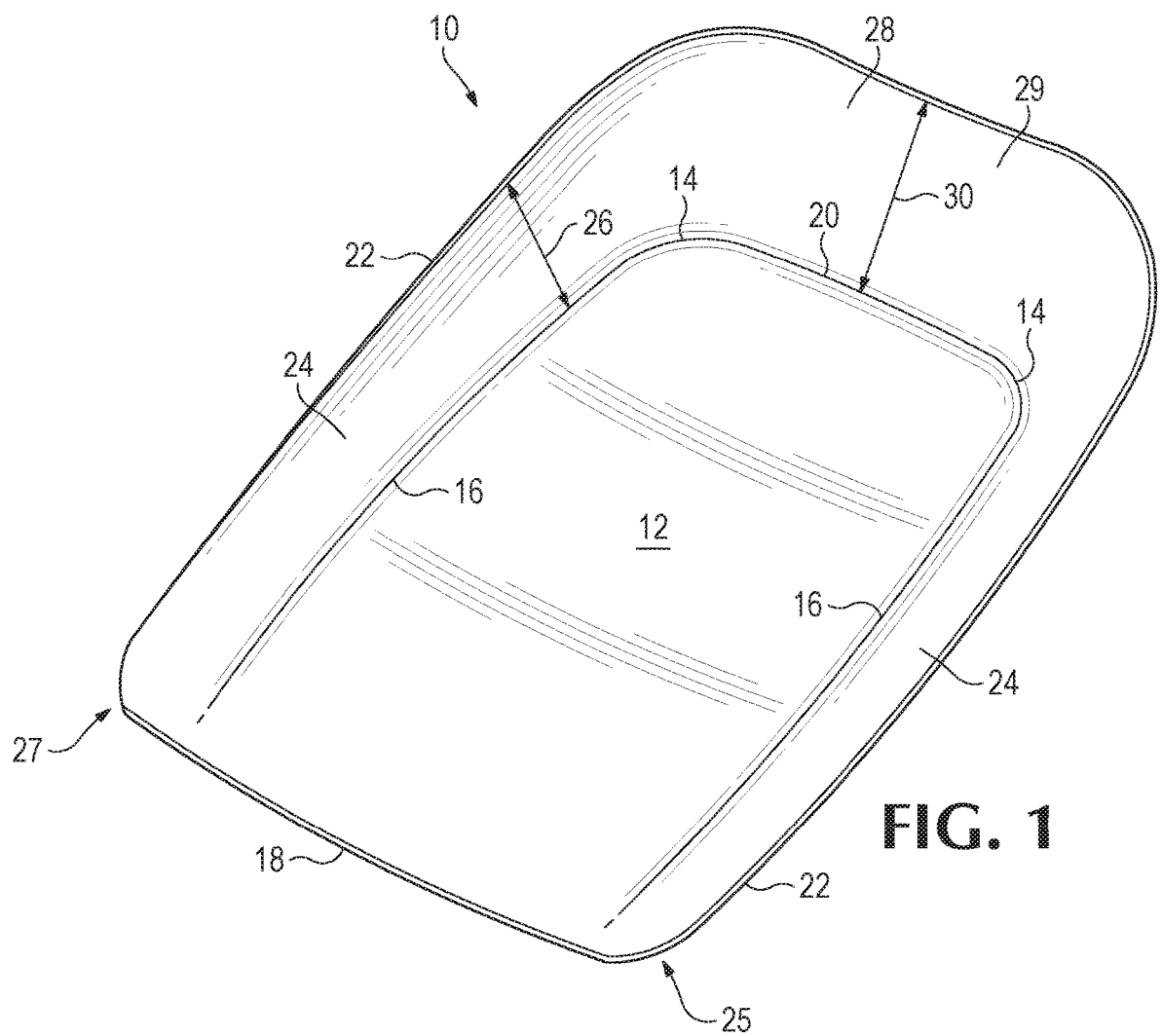
FIG. 1 is an isometric top view of an embodiment of the food serving apparatus.

FIG. 1 herein shows an embodiment of the present invention, a food serving apparatus 10. The food serving apparatus 10 may be partially made of a generally resiliently deformable material which can be bent and will return to its original shape. The apparatus 10 may be made of a single type of resilient material or a combination of a less-resiliently deformable and a more resiliently deformable material.

The food serving apparatus 10 may have a bottom surface 12, as best viewable in FIG. 1. The bottom surface 12 may be resiliently deformable, may have a generally rectangular shape, and may have one or more rounded corners 14. In the embodiment shown in FIG. 1, two of the four corners of the bottom surface 12 are rounded. The bottom surface 12 may also have two lateral sides 16, a front side 18 and a back side 20. Such an identification of sides may, however, be subject to the shape of the bottom surface 12. Alternative bottom surface 12 shapes are also envisioned, including approximate oval shapes and triangular shapes (not shown).

The bottom surface 12 includes a perimeter, indicated generally at 22. The perimeter 22 may include two resilient side walls 24 that extend over the length of each lateral side of the bottom surface 16, such that each side wall 24 has a generally varying depth 26. The perimeter may also include a back wall 28 that extends from the back side of the bottom surface 20 and has a depth 30. The back wall 28 may extend from the back side of the bottom surface 20 so as to connect the two side walls 24. The perimeter 22 as used herein refers to the combination of the dual side walls 24 and the back wall 28. The perimeter may have a first end 25, a second end 27 and a middle portion 29, shaped so that the depth of the first and second ends are less than the depth of the middle portion, and the side walls 24 gradually increase in depth 26 toward the back wall 28. The embodiment shown herein does not identify the specific parts of the perimeter 22 that are to be considered the transition between a side wall 24 and the back wall 28. Such a lack of distinction is intentional to illustrate that the description of the side and back walls 24, 28 is to be considered as referring to general areas of the perimeter 22, instead of specified dimensions.

The depth of the side walls 26 and the back wall 30 may vary depending on a manufacturer's or user's preference. As best viewable in FIGS. 4 and 5, a side wall 24 may have a roughly triangular shape which gradually narrows in depth from the back side 20 to the front side 18 of the bottom surface 12. Therefore, the side walls 24 may have a smaller depth closer to the front side 18 and a greater depth closer to the back side 20. The depth 30 of the back wall may also be substantially the same as the depth 26 of the side walls at the back side 20 of the bottom surface 12.

As best viewable in FIG. 3, the side walls 24 are shaped and sized in a manner such that when force is applied to the side walls in a direction indicated by arrows 32, the side walls 24 are capable of automatically bending resiliently inward toward the center 38 of the bottom surface 12, as illustrated by curved lines 36. In use, when the apparatus 10 is inserted into a container such as, but not limited to, an open bag 34, the tension of the flexible bag walls 40 automatically forces the side walls 24, and in some instances the bottom surface 12, of the apparatus to substantially conform resiliently to the inside of the inner circumference of the bag 34. Such a bag may be made of metalized polypropylene or low-density polyethylene flexible film; however, use with other deformable types of containers made of other materials is envisioned as well.

The side walls 24 also have sufficient rigidity and resiliency such that when the apparatus 10 is partially removed from, or inserted into, the bag 34, such as shown in FIGS. 2 and 3, respectively, the side walls 24 apply resilient force against the walls of the bag 40 at the opening 46 of the bag to hold the bag open without tearing or otherwise damaging a normal snack food bag wall 40 of the above-described flexible film material, having a wall thickness within the range of 10 to 250 micrometers. Once the apparatus 10 is removed from the bag 34, the resiliency of the side walls 24 and in some instances, the bottom surface 12, allow the apparatus 10 to return to its original form, such as shown in FIG. 1.

The side walls 24 and the back wall 28 of the apparatus 10 preferably extend outwardly and upwardly from the lateral sides 16 and back side 20 of the bottom surface 12 as shown in FIG. 1, when not deformed by insertion into a bag. As best viewed in the section view shown in FIG. 4, an angle of extension 42 is formed between the back wall 28 and the bottom surface 12 in the absence of such deformation. A similar angle of extension is formed transversely between the side walls 24 and the bottom surface 12 (not shown). The respective angles of extension between the bottom surface 12, and the back wall 28 and side walls 24, respectively, may be between 45 and 135 degrees.

Figure 4:
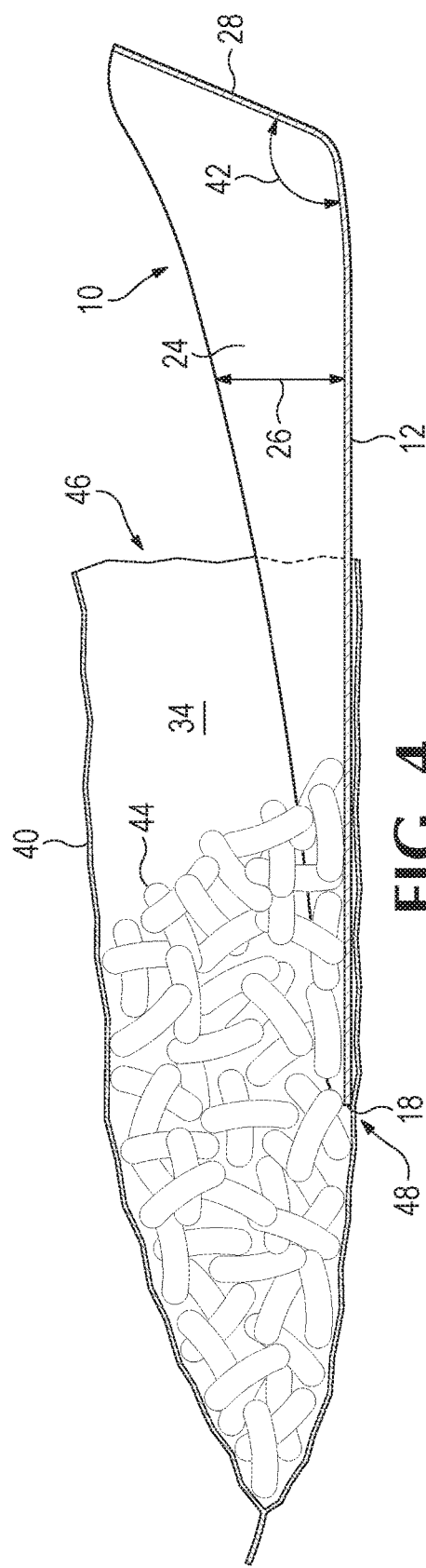
FIG. 4 is a section view of an embodiment of the food serving apparatus positioned inside a snack food bag, preparatory for receiving at least a portion of the snack food contained inside the bag.
Figure 5:
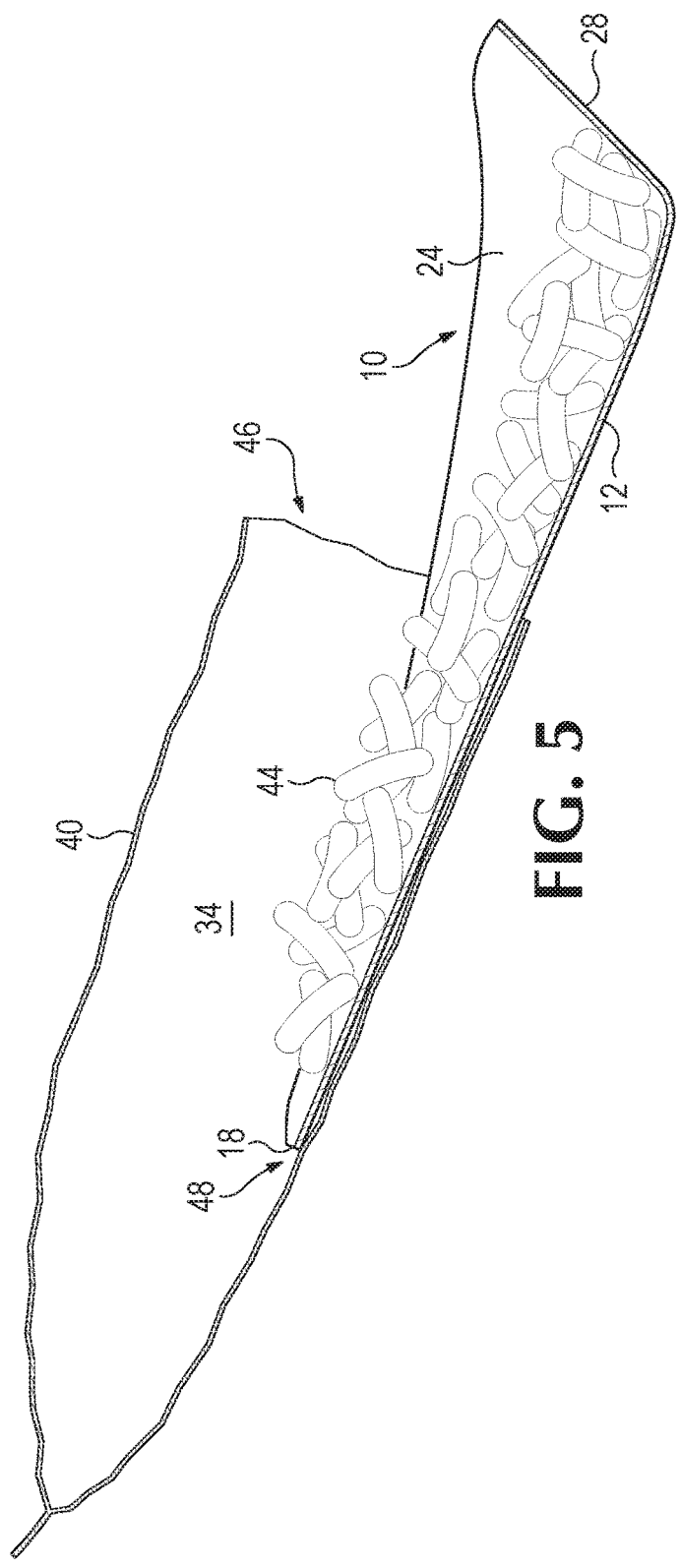
FIG. 5 is a section view of the embodiment of the food serving apparatus shown in FIG. 4 with the apparatus receiving a substantial portion of the snack food contained inside the bag.

FIGS. 2, 4 and 5 exemplify a manner of using the apparatus 10 to serve snack foods 44 from a bag 34. First, the front end 48 of the apparatus 10 is placed into the open end of a bag such as 46. In some instances, the user may roll or bend the side walls 24 resiliently toward the center 38 of the apparatus to fit the front end 48 into the open end or mouth of the snack food bag 46. FIG. 3, for example, shows that the side walls 24 become resiliently curved toward the center 38, as a result of resistance of the bag to the insertion of the apparatus 10. More specifically, due to the deformable resiliency of the apparatus 10, during insertion, the side walls 24 push resiliently outwardly against the bag walls 40, therefore maintaining close contact between the bag walls 40 and the apparatus 10. By maintaining such close contact, the side walls 24 and the bottom surface 12 can resiliently surround a desired portion of the snack food 44 in the bag 34. The apparatus 10 may substantially conform resiliently to the flexible shape of the bag 34, thereby containing the snack food 44 within the apparatus 10 and the bag 34. Meanwhile, the resiliently deformable side walls 24 also function to keep the bag open, as best shown in FIG. 3, as the side walls 24 are biased outwardly toward their original, uncurved positions.

Once at least a portion of the apparatus 10 is inside the bag 34, as shown in FIG. 4, a user may simply tilt the apparatus 10 and bag 34 together, as shown in FIG. 5, to urge the snack food toward the back wall 28 of the apparatus 10. At this point, a user may use the apparatus 10 alone or along with the bag 34 to serve the snack food. The user may periodically re-fill the portion of the apparatus 10 proximate to the back wall 28 by repeating the action shown in FIG. 5, because the apparatus 10 holds the flexible bag 34 open, therefore facilitating continued access of the snack foods 44.

Once a user chooses to store the snack food back into the bag 34, the user can simply tilt the apparatus 10 so that the snack foods 44 slide along the bottom surface 12 back into the bag 34. Then the user may remove the apparatus 10 from the bag 34 and seal the open end 46 as needed.

In some instances, a user can turn the apparatus 10 upside-down prior to insertion so that the bottom surface 12 slides against a top side of the bag 34 (not shown). In so doing, the snack food 44 would be away from the apparatus, resting on the bottom of the bag 34, and the insertion of the apparatus 10 would avoid damaging or breaking any snack food 44 during insertion. Once the apparatus 10 is fully inserted into the bag 34, the user may then turn the apparatus 10, together with the bag 34, right-side-up, so that the snack food 44 is captured by, and rests on, the bottom surface 12, as shown in FIGS. 2 and 5. A user may also use the same process in reverse when removing the apparatus 10 from the bag 34, by first turning the apparatus 10 and bag upside-down prior to removal of the apparatus 10 from the bag 34.

Use of the embodiments described herein is not limited to serving snack foods. Other envisioned uses include using the apparatus 10 to dispense food or items from other types of containers such as boxes or tubes. The apparatus 10 may also be used as a dispenser or as a temporary container for items such as freshly-picked herbs, fruit or pet food, or for temporary storage for items such as crafting materials or machine parts.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A food serving apparatus, comprising:
   a bottom surface integrally formed with opposed first and second perimeter side walls configured to be resiliently deformable toward each other automatically in response to insertion of said food serving apparatus into an open snack bag so as to maintain the opening of the snack bag in an expanded configuration, and without rupturing the sides of said snack beg, the bottom surface substantially flat over at least a major portion of the distance between said first and second perimeter side walls.

2. The food serving apparatus of claim 1 wherein the bottom surface is also resiliently deformable.

3. The food serving apparatus of claim 1, wherein each of said first and second perimeter side walls has a front end and a back end, and wherein each of said first and second perimeter side walls tapers in height in a direction from the back end to the front end.

4. The food serving apparatus of claim 3 where the perimeter side walls and the bottom surface form a tray sized to hold a refillable portion of food and the tray is configured to be refilled from the bag while at least partially in the bag by tipping the bag.

5. The food serving apparatus of claim 1, wherein the bottom surface is upwardly curving proximate each perimeter side wall, and an angle between the substantially flat portion of said bottom surface and a respective segment of the each of the first and second perimeter side walls is between 45 and 135 degrees.

6. The food serving apparatus of claim 5, wherein
said bottom surface includes two lateral sides, a front side, and a back side;
wherein said opposed first and second perimeter side walls extend along respective ones of the two lateral sides; and
wherein a resiliently deformable back wall extends from said back side and connects to each of said opposed first and second perimeter side walls.

7. The food serving apparatus of claim 6, wherein at least one of said opposed first and second perimeter side walls has a substantially triangular shape when relaxed, said triangular shape gradually narrowing in a direction from said back side toward said front side.

8. The food serving apparatus of claim 6, wherein each of said opposed first and second perimeter side walls has a greater side wall depth that is substantially the same as said back wall depth.

9. The food serving apparatus of claim 1, wherein each of said first and second perimeter side walls maintains the opening of the snack bag in an expanded configuration while deformed under pressure from the snack bag, and without rupturing the sides of the snack bag when the snack bag is made of at least one of flexible metalized polypropylene film and flexible metalized polyethylene film, having a thickness within a range of 10 to 250 micrometers.

10. A food serving apparatus, comprising;
a bottom having respective first and second lateral sides, a front side, and a back side;
a back wall extending from the back side, the back wall having a back wall depth; and
two resiliently deformable triangular-shaped side walls, extending from the first and the second lateral sides, respectively, each side wall having a first end depth narrowing toward the front side, so as to form said triangular-shaped side walls, wherein each side wall is capable of bending toward the other side wall in response to lateral pressure from a snack bag upon insertion into the snack bag, and where the side walls, the back wall, and the bottom form a tray sized to hold a refillable portion of food while at least partially in a snack bag, and the tray is configured to be refilled from the bag while at least partially in the bag by tipping the bag.

11. The food serving apparatus of claim 10, wherein said side walls are configured to maintain the opening of the snack bag in an expanded configuration when said food serving apparatus is at least partially inserted into said snack bag, and without rupturing the sides of said snack bag.

12. The food serving apparatus of claim 10, wherein said resiliently deformable side walls automatically bend toward a for centerline of said food serving apparatus in response to insertion of said apparatus.

13. The food serving apparatus of claim 12, wherein bending can be accomplished without rupturing a container comprised of at least one of flexible metalized polypropylene film and flexible metalized polyethylene film, having a thickness within a range of 10 to 250 micrometers.

14. The food serving apparatus of claim 10 wherein said bottom is resiliently deformable.

15. The food serving apparatus of claim 10 wherein said apparatus includes a resiliently deformable back wall that extends from said back side.

16. The food serving apparatus of claim 15 wherein said back wall has a depth and said side walls of substantially triangular shape each have a greater depth and smaller depth, such that said back wall depth is the same as said side wall smaller depth.

17. The food serving apparatus of claim 10 where the bottom is substantially flat over a major portion of the distance between the first and second lateral sides.

* * * * *